Patented Feb. 6, 1951

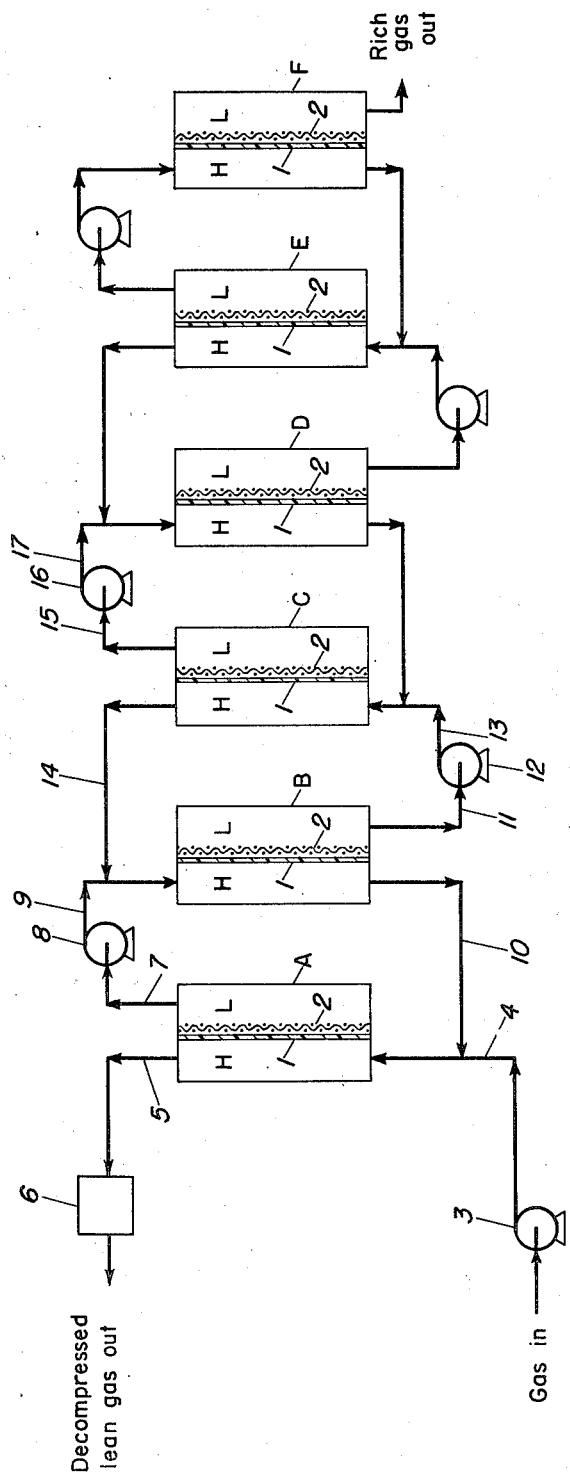

2,540,152

UNITED STATES PATENT OFFICE 2,540,152

RECOVERY OF LIGHT ELEMENTAL GASES

Sol W. Weller, Pittsburgh, Pa., assignor to the United States of America as represented by the Secretary of the Interior Application December 10, 1949, Serial No. 132,347

15 Claims. (Cl. 183—115)

(Granted under the act of March 3, 1883, as amended April 30, 1928; 370 O. G. 757)

The invention herein described and claimed may be manufactured and used by or for the Government of the United States of America for governmental purposes without the payment of royalties thereon or therefor.

This invention relates to the recovery of light elemental gases from admixture with other gases. More particularly, the present invention is concerned with a process for the recovery of hydrogen and helium from naturally occurring and industrially produced gas mixtures by a process involving permeation through thin, non-porous membranes composed of an organic film-forming material.

The recovery of hydrogen and helium from the type of gas mixtures in which these gases usually occur is quite difficult. Most often, it is desired to recover these gases from admixtures with low boiling gases, such as nitrogen, methane, carbon monoxide, and oxygen, which are difficult to remove by chemical scrubbing. In large scale practice, the usual procedure for recovering hydrogen and helium from such gas mixtures involves a low temperature fractionation in which all the gases have to be cooled to temperatures so low that the bulk of all the gases, except hydrogen or helium is liquefied. This low temperature fractionation, usually termed a "Linde process," requires complicated and expensive equipment and, as a result, is relatively costly.

Various other methods have been suggested for recovering these gases. For example, it has been suggested that hydrogen may be obtained from water gas by permitting the water gas to diffuse through a porous diaphragm, advantage being taken of the different rates of diffusion of hydrogen and carbon monoxide through the pores in the diaphragm. The factors of separation in a process of this type, however, are too low to provide a commercially feasible process. It has also been suggested that hydrogen may be recovered from admixture with other gases by allowing the hydrogen-containing gases to permeate through thin films of platinum or palladium heated to high temperatures, but the high cost of platinum or palladium prohibits the use of this process on a large scale.

It is an object of the invention to provide a process for the recovery of hydrogen and helium from admixture with other gases which may be operated on a large scale without special and expensive equipment. It is a further object of the invention to provide a process for the recovery of hydrogen and helium which operates on the principle of selective permeation and utilizes relatively cheap and readily available permeable membranes.

These and other objects of the invention which will become apparent from the description which follows, are attained in accordance with the invention by our discovery that thin, non-porous membranes comprised essentially of plastic, film-forming materials selected from the group consisting of polystyrene and ethyl cellulose, are admirably suited for the recovery of hydrogen and helium from admixture with other gases, particularly from admixture with nitrogen, carbon monoxide, gaseous hydrocarbons, oxygen, and argon. Thus, in accordance with the process of the invention, hydrogen may be recovered from such industrial gas mixtures as the tail gas from catalytic cracking units in petroleum refineries, from water gas, from producer gas, and from the tail gas from various hydrogenation processes. Helium may be recovered, for example, from helium-containing natural gas where it occurs most often.

The suitability of the membranes of the invention is largely due to the surprising property which they possess of being many times more permeable to hydrogen and helium than to many other gases. Their high selectivity enables a high degree of recovery of the desired component to be obtained in a small number of permeation stages.

In Table I below, the separation factors for polystyrene and ethyl cellulose membranes are given for a number of binary gas mixtures. The separation factors given in Table I are defined as the ratio of the absolute permeability of hydrogen or helium to the absolute permeability of the other component. The absolute permeability of a particular gas is determined by the volume of the gas permeating through unit membrane area, per unit time and unit pressure gradient, for a membrane of known thickness.

Table I

| Gas Mixture | Separation Factor for— | |
|---|---|---|
| | Polystyrene membrane | Ethyl cellulose membrane |
| $H_2+N_2$ | 22 | 15 |
| $H_2+CO$ | 17.4 | 13.8 |
| $H_2+CH_4$ | 21.2 | 6.6 |
| $H_2+C_2H_6$ | 22 | |
| $H_2+CH_2=CH_2$ | 21.2 | 4.1 |
| $H_2+CH\equiv CH$ | 11 | |
| $H_2+CH_2=CH-CH_3$ | 21.2 | |
| $H_2+O_2$ | 7.5 | 4.4 |
| $H_2+Argon$ | 10.3 | 6.4 |
| $He+N_2$ | 16 | 10.8 |
| $He+CO$ | 12.6 | 10 |
| $He+CH_4$ | 14.6 | 4.8 |
| $He+C_2H_6$ | 16 | |
| $He+CH_2=CH_2$ | 14.6 | 3.0 |
| $He+CH\equiv CH$ | 8.0 | |
| $He+CH_2=CH-CH_3$ | 14.6 | |
| $He+O_2$ | 5.5 | 3.2 |
| $He+Argon$ | 7.5 | 4.7 |

The suitability of these membranes for use in the process of the invention is further enhanced by the fact that they have a characteristically high absolute permeability as well as a high selectively toward hydrogen and helium. A high absolute permeability is of importance since this is a measure of the total amount of gas that can be processed in a given time through a given film area. Although a membrane might be highly selective, if it has a low absolute permeability, it can not be economically utilized for large scale separation because of the large membrane area that would be required.

The naturally high absolute permeability of the membrane of the invention is further enhanced by the fact that they may be prepared in thicknesses as low as .0001 inch and if supported properly may be installed and used under pressure without danger of fracture. In a process involving gas separation by permeation through a non-porous membrane, the thickness of the membrane is of great importance since the absolute rate of permeation varies inversely with the membrane thickness.

Broadly the process of the invention involves the steps of bringing the gas mixture from which helium or hydrogen is to be recovered in contact with one side of a thin, non-porous membrane comprised essentially of a plastic, film-forming material selected from the group consisting of polystyrene and ethyl cellulose, causing a portion of the gas mixture to permeate through the membrane and removing the permeated gas mixture from the opposite side of the membrane.

It is essential that the membranes of the invention be non-porous, that is, be free from pin holes and other defects destroying their continuity. Discontinuity in the membrane large enough to allow gas to leak through rather than permeate through the body of the membrane almost completely destroys the selectivity of the membrane towards hydrogen or helium. In this connection, it is to be emphasized that the separation process of the invention does not operate on the same principal as separation of gases by diffusion through porous septa wherein advantage is taken of the difference in the rates of diffusion of the component gases through the pore structure. In processes of this nature, the overall rate of diffusion is high but the factor of separation depends on the ratio of the square roots of the molecular weights of the gases to be separated. According to this process, for example, the maximum factor of separation for a mixture of hydrogen and nitrogen would be the ratio of the square root of the molecular weight of nitrogen to the square root of the molecular weight of hydrogen which is equivalent to a separation factor of 3.8. Using a film of polystyrene, on the other hand, a separation factor (as measured by the ratio of the permeability of polystyrene to hydrogen to its permeability to nitrogen) as high as 22 may be obtained. The process of the present invention entails a permeation of the gas mixture through the body of the membrane rather than through pores present therein, and depends upon the fact that hydrogen and helium permeate through the membrane in this manner at a considerably faster rate than many other gases. The presence of pores in the membrane virtually destroys its selectivity by permitting large quantities of relatively unseparated gas to leak through.

In general, the selectivity of the membrane is independent of the membrane thickness. However, as previously mentioned, the absolute or overall permeability, measured by the total amount of gas which permeates through a membrane of a certain area during a certain period of time is inversely proportional to the thickness of the membrane. Since the rate of permeation of a gas through a solid membrane proceeds rather slowly, the thickness of the membrane must be reduced as much as possible if usable amounts of gas are to be obtained. Membranes of the minimum thickness which may be prepared free from pin holes or other discontinuities, which have sufficient mechanical stability to withstand handling during installation, and which will not rupture under conditions of use should be utilized. Preferably, the membranes of the present invention should be of a thickness in the range of from about 0.0001 to 0.005 inch. In general, films having a thickness less than 0.0001 inch are too fragile for practical purposes. When the thickness of the membrane exceeds 0.005 inch, the absolute or overall rate of permeation becomes quite slow and uneconomical.

In the preferred embodiment of the invention, the process is carried out by continuously flowing a stream of the gas mixture to be separated in contact with one side of the membrane, maintaining a pressure drop across the membrane, allowing a portion of the gas mixture to permeate from the higher to the lower pressure side of the membrane, and continuously removing the permeated gas mixture from the lower pressure side.

In order to achieve a separation, it is, of course, essential that only a portion of the mixture to be separated be allowed to permeate. Of a given volume of gas to be separated, the larger the portion that is allowed to permeate in a single permeation stage, the poorer the degree of separation. On the other hand, the smaller the proportion of the mixture brought in contact with the membrane which is allowed to permeate therethrough, the greater the degree of separation. The proportion of gas permeating is conveniently controlled according to the preferred embodiment of the invention by adjusting the rate of flow of the gas stream past the membrane. The faster the rate of flow past the membrane the smaller will be the portion of the gas mixture that will have an opportunity to permeate, and consequently the greater the degree of separation achieved in that permeation stage. A high rate of flow to give the maximum possible separation is not necessarily the optimum rate of flow. The optimum rate will depend upon a large number of cost factors which will be discussed more in detail subsequently.

The provision of a pressure drop across the membrane according to the preferred embodiment of the invention assures the maintenance of a differential in the partial pressures of the gases on either side of the membrane which is a necessary condition if the permeation process is to proceed. Preferably the high pressure side of the membrane is maintained at a pressure well above atmospheric, while the low pressure side is maintained at a lower pressure, most conveniently atmospheric. If desired, however, the pressure on the high pressure side may be atmospheric while a subatmospheric pressure is maintained on the low pressure side, or any other arrangement provided whereby a pressure drop is created across the membrane. Since the overall or absolute rate of permeation is directly proportional to the pressure differential on opposite sides of the membrane, and since the selectivity of the membrane improves to some extent the higher the differential, the pressure differential is maintained as high as possible commensurate with the ability of the membranes to resist rupture under pressure and with the cost of compressing the gas mixture.

Instead of, or in addition to, maintaining a pressure drop across the membrane, the enriched gas permeating through the membrane may be swept away by a stream of inert gas, such as steam, which is easily removed as by condensation, and the necessary differential in the partial pressures of the gases on opposite sides of the membrane maintained in this manner. The sweeping gas, however, introduces many difficulties and is preferably not used.

Due to the high selectivity of the membranes of the invention, substantial recoveries of hydrogen or helium may be made in only one stage of permeation. In many cases, however, where it is desired to obtain a higher concentration of the desired gas than it is possible to obtain in one stage of permeation, as for example, where the desired gas is present in the original gas mixture in a very small concentration, it is desirable to utilize a multi-stage process. The single figure of drawing illustrates such a multi-stage system, and for a better understanding of the invention reference is now made thereto.

A six stage permeation process is illustrated, each stage being designated by the letters A, B, C, D, E, and F, respectively. In its simplest form each stage comprises a chamber divided by a thin, non-porous membrane 1 comprised of polystyrene or ethyl cellulose, into a high pressure portion H and low pressure portion L. A perforated support 2, which may be a wire screen, is arranged on the low pressure side of the membrane to prevent its collapse when placed under pressure. A gas mixture, relatively lean in the component it is desired to recover, such as natural gas containing about 1% helium, is compressed by means of compressor 3 to a pressure, for example, of 15 atmospheres. The compressed gas is then led into the high pressure side of the first stage and brought in contact with the unsupported side of membrane 1. The opposite side of the membrane is maintained at some lower pressure most conveniently atmospheric. As the high pressure gas on the unsupported side of the membrane passes through the stage in contact with the membrane, a portion of the gas permeates through the membrane while the remainder passes out of the opposite end of the stage by line 5. The exit gas, relatively depleted in the component it is desired to recover, may be conducted away and utilized for any desired purpose. If desired, the compressional energy of this gas may be recovered by means of expansion engine 6 or other suitable means for recovering pressure energy. The portion of gas which has permeated through the membrane is relatively rich in the more permeable gas which it is desired to recover, and this gas is withdrawn from the low pressure side of the stage by line 7, recompressed by means of compressor 8, and delivered to the high pressure side of the second stage B by means of line 9. In the second stage, the same process is repeated. A portion of the gas stream flowing past the membrane permeates from the higher to the lower pressure side of the membrane, and a portion of the gas relatively lean in the component is desired to recover, leaves the high pressure side of the stage by line 10, and is recycled to the high pressure side of the first stage A. The gas mixture on the low pressure side of the membrane in stage B, now further enriched in the component it is desired to recover, is withdrawn therefrom by line 11, recompressed by compressor 12, and recirculated to the high pressure of stage C by line 13. High pressure gas from stage C is withdrawn by line 14 and recycled to the high pressure side of stage B. Enriched gas from the low pressure side of stage C is withdrawn by means of line 15, recompressed by compressor 16, and fed to the high pressure side of stage D by line 17. The very same process is repeated in stages D, E, and F, the lean gas from the high pressure side of each stage being recycled to the high pressure side of the last preceding stage, while the enriched gas from the low pressure side of each stage is compressed and recirculated to the high pressure side of the next succeeding stage for further enrichment. Any desired number of stages may be employed depending upon the particular gas mixture being processed.

In order to obtain relatively high rates of permeation through the membranes a high pressure differential should be maintained between the high and low pressure side of the membrane. It is preferred to operate with pressures on the high pressure side of at least 4 atmospheres and as high as 30 atmospheres. Most conveniently the low pressure side of the membrane is maintained at atmospheric pressure. The higher the pressure differential, the greater the rate of permeation, and thus the smaller the membrane area required to produce a given quantity of enriched gas in a given time. Higher pressures however, mean higher compression costs. The optimum pressure will always depend on striking a balance between the cost of increased membrane area and the cost of increasing the operating pressure. The rupture point on the membrane employed will determine the upper limit of the pressure differential that may be employed with a given membrane.

The rate of flow of the gas mixture on high pressure side of the membrane will, to some extent, be determined by the degree of separation it is wished to obtain in a single stage of permeation. As previously pointed out, high rates of flow reduce the fraction of gas which permeates and lead to higher degrees of separation in a single stage. The higher the rate of flow however, the more energy must be expended to compress the gas mixture which flows past the membrane. Since only a portion of this pressure energy contained in the fraction which does not permeate can be recovered, there will always be a point where higher rates of flow to obtain better separations will be uneconomical in view of the high expenditure of unrecoverable pressure energy. Low rates of flow on the other hand allow a greater proportion of the gas to permeate and consequently give poorer separations in a single stage, and therefore a greater number of stages is required to provide the same concentration of the desired gas. The optimum rate of flow of gas mixture past the membrane will always lie in a median range and will depend upon striking a balance between the cost of compressing additional gas and the cost of additional permeation stages.

In the process of the invention, the optimum rate of flow under most conditions will be of low order of magnitude due to the relatively low rate at which a gas mixture permeates through solid membranes. In the preferred operation of the process, the rate of flow will be of such an order of magnitude that the flow will be laminar rather than turbulent, and will be characterized by a Reynolds number in the range of from 0.01 to 100.

*Example 1*

The following example illustrates the production of a hydrogen-rich gas starting with a tail gas from a petroleum refinery catalytic cracking unit having the following approximate composition:

| Component | Volume, Percent |
|---|---|
| $H_2$ | 10 |
| $N_2$ | 5 |
| $CO_2$ | 1 |
| $CH_4$ | 23 |
| $C_2H_4$ | 8 |
| $C_2H_6$ | 14 |
| $C_3H_6$ | 16 |
| $C_3H_8$ | 23 |

Two stages of permeation are employed and a polystyrene membrane 0.001 inch in thickness is used in each stage supported on the low pressure side by a perforated metal sheet or wire screen. The gas on the high pressure side in each stage is maintained at about 15 atm. while the low pressure side is maintained at 1 atmosphere. Since the refinery gas is available from the refinery at a pressure of about 15 atmospheres, no compressor is needed in the first stage, the only recompression needed being supplied by interstage compressor 8 to recompress the gas coming from the low pressure side of the first stage before passing it to the high pressure side of the second stage.

The rate of flow of the gas on the high pressure side of the first stage is adjusted so that the lean gas passing out of the high pressure side of the first stage will contain about 5% hydrogen. No attempt is made to recover this residual hydrogen, any desired use being made of this lean gas. Under these conditions, the gas leaving the low pressure side of the membrane in the first stage will have a hydrogen content of about 47%. This rich gas mixture is recompressed to 15 atmospheres by interstage compressor 8 and led into the high pressure side of the second stage B. The rate of flow of the gas mixture on the high pressure side of stage B is adjusted so that the lean gas leaving the high pressure side of the second stage will have a composition approximately the same as the original refinery gas entering the high pressure side of the first stage, and this gas is recycled to the high pressure side of the first stage where it joins the ingoing gas stream. A gas, further enriched in hydrogen, is obtained from the low pressure side of stage B.

In Table II below is given the percent of hydrogen in the gas entering and leaving the high pressure side of each stage, the percent of hydrogen in the gas leaving the low pressure side of each stage, and the fraction of the gas which permeates in each stage when the flow rates on the high pressure side of the membrane in each stage are adjusted as described above.

*Table II*

| Stage | Fraction of gas permeating | Percent $H_2$ in gas entering high pressure side | Percent $H_2$ in gas leaving high pressure side | Percent $H_2$ in gas leaving low pressure side |
|---|---|---|---|---|
| A | .124 | 10 | 4.8 | 47.1 |
| B | .492 | 47.1 | 10 | 85.4 |

In accordance with the example above, a total of 57% of the hydrogen contained in the original refinery gas is recovered and a rich gas containing 85% hydrogen is produced in two stages of permeation. Such a gas is sufficiently rich in hydrogen to be useful in various hydrogenation processes such as the hydroforming process used in the petroleum industry. In this example, since only two stages of permeation are required, the amount of film area necessary is relatively small. Since the refinery gas is obtained under pressure directly from the refinery, the power requirements for the recovery process are substantially reduced since only one compressor is needed between the first and second stages to compress the comparatively small fraction of gas which permeates in the first stage.

*Example 2*

This example illustrates the recovery of hydrogen from the hydrogenation tail gas produced as a by-product of the high pressure hydrogenation of coal, this tail gas having the following approximate composition:

| Component | Volume, Per cent |
|---|---|
| Hydrogen | 60 |
| Methane | 21 |
| $C_2H_6$ | 7 |
| $C_3H_8$ | 5 |
| CO | 4 |
| $N_2$ | 3 |

Two stages of permeation are employed, and a polystyrene membrane 0.001 inch in thickness is used in both stages, supported on the low pressure side by a perforated metal sheet or wire screen. The tail gas is obtained from the hydrogenation plant at high pressures of about 200 atmospheres. This gas is reduced to a suitable pressure of about 15 atmospheres which pressure is maintained on the high pressure side of both stages. In order to recover the greater part of the relatively expensive hydrogen, a rate of flow of gas on the high pressure side of the first stage is selected so that the lean gas leaving the high pressure side of the first stage contains only 3.8% hydrogen. Under these conditions, the gas which permeates to the low pressure side of the first stage will contain about 86% hydrogen. This rich gas mixture is recompressed to 15 atmospheres by interstage compressor 8 and led into the high pressure of the second stage B. The rate of flow of the gas on the high pressure side of stage B is so adjusted that the lean gas leaving the stage will have a composition approximately the same as the original gas entering the high pressure side of stage A, or approximately 60% hydrogen, and this gas is recycled to the high pressure side of stage A where it joins the ingoing gas stream. A gas containing about 98% $H_2$ is obtained from the low pressure side of stage B.

In Table III below is given the percent of hydrogen in the gas entering and leaving the high pressure side of each stage, the percent of hydrogen in the gas leaving the low pressure side of each stage, and the fraction of the gas which permeates in each stage when the flow rates on the high pressure side of the membrane in each stage are adjusted as described above.

*Table III*

| Stage | Fraction of gas permeating | Percent $H_2$ in gas entering high pressure side | Percent $H_2$ in gas leaving high pressure side | Percent $H_2$ in gas leaving low pressure side |
|---|---|---|---|---|
| A | .685 | 60 | 3.8 | 85.9 |
| B | .675 | 85.9 | 60 | 98.4 |

In the above example a gas containing 98.4% hydrogen is obtained in two stages of permeation and 98% of the hydrogen in the original gas mixture is recovered. If desired, the permeated gas from the low pressure side of the first stage may be utilized without further enrichment since for many purposes this concentration of hydrogen is sufficient.

*Example 3*

This example illustrates the recovery of helium from natural gas containing approximately 1% of helium and 99% methane and nitrogen. A polystyrene membrane 0.001 inch in thickness is used in each stage suitably supported. Six stages of permeation are employed. The gas on the high pressure side in each stage is maintained at 15 atmospheres while the low pressure side is maintained at 1 atmosphere. No compression will ordinarily be required in the first stage since natural gas is usually obtained under pressure from natural sources.

The rate of flow of gas on the high pressure side is adjusted so that 90% of the helium in the original gas permeates through the membrane and the lean gas leaving the first stage contains about 0.1% of helium. It is in general desired to recover at least about 90% of the helium present in the natural gas to avoid waste of this natural resource. No attempt is made to recover the residual helium in the lean gas from the first stage, this gas being returned to the pipe-line to be utilized for any desired purpose. An enriched gas mixture containing approximately 3½% helium from the low pressure side of the first stage is recompressed to 15 atmospheres by interstage compressor 8 and led into the high pressure side of second stage B. The rate of flow of the gas mixture on the high pressure side of stage B, and on the high pressure side of each succeeding stage, is adjusted so that the gas leaving the high pressure of the stage will have the same composition as the gas entering the high pressure side of the last preceding stage. Thus, in stage B, the rate of flow on the high pressure side is adjusted so that the gas leaving the high pressure side of the stage has a composition of 1% helium, and this gas is recycled to the high pressure side of stage A where it joins the ingoing gas stream. In Table IV below is given the percent of helium in the gas entering and leaving the high pressure side of each stage, the percent of helium in the gas leaving the low pressure side of each stage, and the fraction of the gas which permeates in each stage when the flow rates on the high pressure side of the membrane in each stage are adjusted as described above.

*Table IV*

| Stage | Fraction of gas permeating | Per cent He in gas entering high pressure side | Per cent He in gas leaving high pressure side | Per cent He in gas leaving low pressure side |
|---|---|---|---|---|
| A | .267 | 1.0 | 0.13 | 3.4 |
| B | .186 | 3.4 | 1.0 | 13.9 |
| C | .273 | 13.9 | 3.4 | 41.8 |
| D | .420 | 41.8 | 13.9 | 80.3 |
| E | .707 | 80.3 | 41.8 | 96.3 |
| F | .836 | 96.3 | 80.3 | 99.4 |

It will be noted that in six stages of permeation a gas containing over 99% helium is obtained, the overall recovery of helium from the original natural gas being about 90%. The power requirements for the above six-stage permeation process for the recovery of helium are quite low because of the fact that the original natural gas is obtained already under pressure and the bulk of the natural gas treated is returned still under pressure as lean gas from the first stage to the high pressure pipeline from which it was originally obtained.

The process of the invention, involving selective permeation through non-porous membranes, is of a physical chemical nature, probably involving the differential solubility and the differential rate of diffusion of the gases in the membranes. It is not possible to predict the suitability of any given membrane for use in the process of the invention from its chemical nature since membranes quite closely related chemically to the membranes of the invention have been found unsuitable. A membrane having high selectivity for the gases to be recovered and a relatively high absolute permeability is required if a successful process is to be obtained. For the recovery of hydrogen and helium from gas mixtures containing these gases, membranes of polystyrene and ethyl cellulose are eminently suited since both of these membranes possess these desired characteristics in a high degree.

While membranes of polystyrene and ethyl cellulose are useful for recovering hydrogen and helium from gas mixtures in general, these membranes effect the best recovery of helium or hydrogen from admixture with gases selected from the group consisting of nitrogen, carbon monoxide, gaseous hydrocarbons, argon and oxygen. For these gases, particularly with membranes of polystyrene, the selectivities of the membranes are extremely high. Since these are the gases in admixture with which helium and hydrogen are most often found, the process of the invention will find a great number of commercial applications. Thus, hydrogen may be recovered from the large quantities of tail gas obtained from petroleum refinery units consisting almost entirely of hydrogen, nitrogen, and gaseous hydrocarbons. Hydrogen may also be recovered from tail gases resulting from various types of hydrogenation processes wherein the tail gas often contains, besides hydrogen, such gases as gaseous hydrocarbons, nitrogen, and carbon monoxide. Hydrogen may be also recovered from coke oven gas which often contains approximately 50% hydrogen with the remainder being made up of nitrogen, methane, and other gaseous hydrocarbons, and carbon monoxide. Hydrogen may also be recovered from producer gas containing anywhere from 10 to 20% hydrogen with large amounts of nitrogen and carbon monoxide; and from water gas containing hydrogen, carbon dioxide, carbon monoxide, and nitrogen. Particularly with the use of polystyrene membranes, helium may be recovered from natural gas, the source from which helium is almost exclusively derived.

In general, polystyrene has a higher selectivity for helium and hydrogen than membranes of ethyl cellulose, but this advantage is somewhat offset by the fact that ethyl cellulose membranes have a somewhat higher absolute permeability than polystyrene membranes. Although both of these membranes have a general utility for recovering both helium and hydrogen, the choice of which membrane to use will depend somewhat on the precise mixture being separated.

The properties of the membranes of the invention, including their selectivity and absolute permeability, will vary to some extent in accordance with differences in their chemical and physical properties. Thus, with polystyrene the degree of polymerization, as measured by the molecular weight of the polymer units, may cause some variation in the characteristics of the membrane. Likewise, with ethyl cellulose, the degree of etherification may cause variation. Similarly, the presence or absence of plasticizers, the type of solvent employed to prepare the film from which the membrane is made, the amount of stretch given films during casting, and other factors may cause some variation in the selectivity and absolute permeability of the membrane. Copolymers of polystyrene with other unsaturated hydrocarbons such as butadiene where the additional component is present in small amounts are also suitable. Small amounts of other ether groups such as methoxy, present in the ethyl cellulose membrane will not alter the essential characteristics of the membrane for use in the process of the invention.

It is to be understood that the above description and examples are for the purpose of illustrating the invention and it is not intended that the invention be limited thereby nor in any way except by the scope of the appended claims. Other variations and modifications than those suggested specifically above are intended to be included within the scope of the invention.

I claim:

1. A process for the recovery of light elemental gases selected from the group consisting of hydrogen and helium from a gas mixture comprising one of these gases and at least one other gas comprising the steps of bringing said gas mixture into contact with one side of a thin, nonporous membrane comprised essentially of a plastic, film-forming material selected from the group consisting of polystyrene and ethyl cellulose, causing a portion of said gas mixture to permeate through said membrane, and removing the permeated gas from the opposite side of said membrane.

2. A process for the recovery of hydrogen from a gas mixture containing hydrogen comprising the steps of flowing said gas mixture maintained under a predetermined pressure in contact with one side of a thin, nonporous membrane comprised essentially of a plastic, film-forming material selected from the group consisting of polystyrene and ethyl cellulose, maintaining the opposite side of said membrane under a pressure lower than the pressure on said first-mentioned side, allowing a portion of said gas mixture to permeate through said membrane from the higher to the lower pressure side thereof, and removing a hydrogen-enriched mixture from said lower pressure side of said membrane.

3. A process for the recovery of light elemental gases selected from the group consisting of hydrogen and helium from a gas mixture comprising one of these gases and at least one other gas selected from the group consisting of nitrogen, carbon monoxide, gaseous hydrocarbons, argon, and oxygen comprising the steps of bringing said gas mixture into contact with one side of a thin, non-porous membrane comprised essentially of a plastic, film-forming material selected from the group consisting of polystyrene and ethyl cellulose, causing a portion of said gas mixture to permeate through said membrane, and removing the permeated gas from the opposite side of said membrane.

4. A process for the recovery of light elemental gases selected from the group consisting of hydrogen and helium from a gas mixture comprising one of these gases and at least one other gas selected from the group consisting of nitrogen, carbon monoxide, gaseous hydrocarbons, argon, and oxygen comprising the steps of flowing said gas mixture maintained under a predetermined pressure in contact with one side of a thin, non-porous membrane comprised essentially of a plastic, film-forming material selected from the group consisting of polystyrene and ethyl cellulose, maintaining the opposite side of said membrane under a pressure lower than a pressure on said first-mentioned side, allowing a portion of said gas mixture to permeate through said membrane from the higher to the lower pressure side thereof, and removing the permeated gas from said lower pressure side of said membrane.

5. The process according to claim 2 in which the membrane is comprised essentially of polystyrene.

6. A method for recovering hydrogen from a gas mixture comprising hydrogen and at least one other gas selected from the group consisting of nitrogen, carbon monoxide, gaseous hydrocarbons, argon, and oxygen comprising the steps of flowing said gas mixture maintained under a predetermined pressure in contact with one side of a thin, non-porous membrane, comprised essentially of a plastic, film forming material selected from the group consisting of polystyrene and ethyl cellulose, maintaining the opposite side of said membrane under a pressure lower than the pressure on said first-mentioned side, allowing a portion of said gas stream to permeate through said membrane from the higher to the lower pressure side thereof, and removing a hydrogen-enriched gas from said lower pressure side of said membrane.

7. The process according to claim 6 in which the membrane is comprised essentially of polystyrene.

8. A process for recovering helium from a gas mixture comprising helium and at least one other gas selected from the group consisting of nitrogen, carbon monoxide, gaseous hydrocarbons, argon, and oxygen comprising the steps of flowing said gas mixture maintained under a predetermined pressure in contact with one side of a thin, non-porous membrane comprised essentially of a plastic, film-forming material selected from the group consisting of polystyrene and ethyl cellulose, maintaining the opposite side of said membrane under a pressure lower than a pressure on said first-mentioned side, allowing a portion of said gas stream to permeate through said membrane from the higher to the lower pressure side thereof, and removing a helium-enriched gas from said lower pressure side of said membrane.

9. A process according to claim 8 in which the membrane is comprised essentially of polystyrene.

10. A multi-stage process for the recovery of light elemental gases selected from the group consisting of hydrogen and helium from a gas mixture comprising one of these gases and at least one other gas, involving the use of a plurality of permeation stages, wherein each stage comprises a high pressure side and a low pressure side, and wherein the high and low pressure side in each stage is separated by a thin, non-porous membrane comprised essentially of a plastic, film-forming material selected from the group consisting of polystyrene and ethyl cellulose, comprising the steps of compressing the original gas mixture and passing it to the high pressure side of a first permeation stage, removing the permeated gas from the low pressure side of the first stage and each stage thereafter, separately compressing the permeated gas removed from the low pressure side of each stage, separately passing said compressed, permeated gas from the low pressure side of each stage to the high pressure side of the next succeeding stage, recycling a portion of the gas flowing on the high pressure side of each stage, except the first, to the high pressure side of the last preceding stage, while flowing the gas on the high pressure side of each stage in contact with said membrane at a rate selected to allow a predetermined portion of said gas to permeate through said membrane to the low pressure side thereof.

11. A multi-stage process for the recovery of light elemental gases selected from the group consisting of hydrogen and helium from a gas mixture comprising one of these gases and at least one other gas selected from the group consisting of nitrogen, carbon monoxide, gaseous hydrocarbons, argon, and oxygen, involving the use of a plurality of permeation stages, wherein each stage comprises a high pressure side and a low pressure side, and wherein the high and low pressure side in each stage is separated by a thin, non-porous membrane comprised essentially of a plastic, film-forming material selected from the group consisting of polystyrene and ethyl cellulose, comprising the steps of compressing the original gas mixture and passing it to the high pressure side of a first permeation stage, removing the permeated gas from the low pressure side of the first stage and each stage thereafter, separately compressing the permeated gas removed from the low pressure side of each stage, separately passing the compressed, permeated gas from the low pressure side of each stage to the high pressure side of the next succeeding stage, recycling a portion of the gas flowing on the high pressure side of each stage, except the first, to the high pressure side of the last preceding stage, while flowing the gas on the high pressure side of each stage in contact with said membrane at a rate selected to allow a predetermined portion of said gas to permeate through said membrane to the low pressure side thereof.

12. A multi-stage process for the recovery of hydrogen from a gas mixture comprising hydrogen and at least one other gas selected from the group consisting of nitrogen, carbon monoxide, gaseous hydrocarbons, argon, and oxygen, involving the use of a plurality of permeation stages, wherein each stage comprises a high pressure side and a low pressure side, and wherein the high and low pressure side in each stage is separated by a thin, non-porous membrane comprised essentially of a plastic, film-forming material selected from the group consisting of polystyrene and ethyl cellulose, comprising the steps of compressing the original gas mixture and passing it to the high pressure side of a first permeation stage, removing hydrogen-enriched gas from the low pressure side of the first stage and each stage thereafter, separately compressing the hydrogen-enriched gas removed from the low pressure side of each stage, separately passing the compressed hydrogen-enriched gas from the low pressure side of each stage to the high pressure side of the next succeeding stage, recycling a portion of the gas flowing on the high pressure side of each stage, except the first, to the high pressure side of the last preceding stage, while flowing the gas on the high pressure side of each stage in contact with said membrane at a rate selected to allow a predetermined portion of said gas to permeate through said membrane to the low pressure side thereof.

13. The process according to claim 12 in which the membrane is comprised essentially of polystyrene.

14. A multi-stage process for the recovery of helium from helium-containing natural gas involving the use of a plurality of permeation stages, wherein each stage comprises a high pressure side and a low pressure side, and wherein the high and low pressure side in each stage is separated by a thin, non-porous membrane, comprised essentially of polystyrene, comprising the steps of compressing the original gas mixture and passing it to the high pressure side of a first permeation stage, removing a helium-enriched gas from the low pressure side of the first stage and each stage thereafter, separately compressing the helium-enriched gas removed from the low pressure side of each stage, separately passing the helium-enriched gas from the low pressure side of each stage to the higher pressure side of the next succeeding stage, recycling a portion of the gas flowing on the high pressure side of each stage except the first to the high pressure side of the last preceding stage, while flowing the gas on the high pressure side of each stage in contact with said membrane at a rate selected to allow a predetermined portion of said gas to permeate through said membrane to the low pressure side thereof.

15. A process for the separation of helium from helium-containing natural gas comprising the steps of flowing said natural gas maintained under a predetermined pressure in contact with one side of a thin, non-porous membrane comprised essentially of polystyrene, maintaining the opposite side of said membrane under a pressure lower than the pressure on said first-mentioned side, allowing a portion of said natural gas stream to permeate through said membrane from the higher to the lower pressure side thereof, and removing a helium-enriched gas from said lower pressure side of said membrane.

SOL W. WELLER.

REFERENCES CITED

The following references are of record in the file of this patent:

UNITED STATES PATENTS

| Number | Name | Date |
|---|---|---|
| 2,388,095 | Stahley | Oct. 30, 1945 |

FOREIGN PATENTS

| Number | Country | Date |
|---|---|---|
| 266,396 | Great Britain | Feb. 23, 1927 |

OTHER REFERENCES

"Diffusion of Gases Through Membranes," Müller, Physik. Z., 42; 48–53, 1941.

Transactions of the Faraday Society; 35, 628–643, 1939, Chem. Abstract 33, 5264 [3].